United States Patent [19] [11] 4,279,931
Verwaerde et al. [45] Jul. 21, 1981

[54] NON-CARIOGENIC HYDROGENATED STARCH HYDROLYSATE FOR CONFECTIONERY AND PROCESS FOR PREPARING THIS HYDROLYSATE

[75] Inventors: Francoise Verwaerde; Jean-Bernard Leleu; Michel Huchette, all of Lestrem, France

[73] Assignee: Roquette Freres, France

[21] Appl. No.: 38,711

[22] Filed: May 14, 1979

[30] Foreign Application Priority Data

Dec. 11, 1978 [FR] France ............................... 78 34830

[51] Int. Cl.$^3$ ............................ A23L 1/09; C13K 7/00
[52] U.S. Cl. ...................................... 426/48; 426/548; 426/658; 127/38; 435/95; 435/98
[58] Field of Search ............... 426/48, 548, 661, 658; 435/95, 98; 127/38, 40

[56] References Cited

U.S. PATENT DOCUMENTS

| Re. 26,959 | 9/1970 | Conrad | 426/48 |
| 2,822,303 | 2/1958 | Campbell et al. | 426/48 X |
| 2,891,869 | 6/1959 | Lanclois | 426/48 |
| 3,067,066 | 12/1962 | Ehrenthal et al. | 426/48 X |
| 3,137,639 | 6/1964 | Hurst et al. | 426/48 X |
| 3,644,126 | 2/1972 | Bodnar et al. | 426/48 |
| 3,868,464 | 2/1975 | Koaze et al. | 426/48 |

FOREIGN PATENT DOCUMENTS 1517810  9/1969  Fed. Rep. of Germany .
2000580  9/1969  France .
1299206 12/1972 United Kingdom .

Primary Examiner—Robert A. Yoncoskie
Attorney, Agent, or Firm—Larson and Taylor

[57] ABSTRACT

The invention relates to a non-cariogenic hydrogenated starch for confectionery and process for preparing this hydrolysate. This hydrogenated starch hydrolysate comprises a content of polyols of DP higher than 20 which is sufficiently low for the cariogenic character of these polyols not to be troublesome and a content of low molecular weight products, which is sufficiently low for their presence not to interfere with the applicability of said hydrolysates in confectionery. The hydrogenated starch hydrolysate can be used in the manufacture of "hard candies" and chewing gums.

10 Claims, No Drawings

NON-CARIOGENIC HYDROGENATED STARCH HYDROLYSATE FOR CONFECTIONERY AND PROCESS FOR PREPARING THIS HYDROLYSATE

The invention relates to a non-cariogenic hydrogenated starch hydrolysate for confectionery in general, and more particularly for the manufacture of "hard candies", the term "confectionery" including chewing gums, toffees, chocolates and other equivalent products.

It relates also to the process for preparing said hydrolysate.

Non-cariogenic hydrogenated starch hydrolysates, for example sorbitol syrups, are already known; furthermore, the use of hydrogenated starch hydrolysates for confectionery has already been proposed.

However, these proposals have not led to results which are satisfactory in all respects.

In fact, it occurred that, when the known hydrolysates were not cariogenic, it was difficult to use them in confectionery, particularly in the manufacture of hard candies. Conversely, hydrolysates utilizable technologically in confectionery and particularly for the manufacture of these candies, appeared as being cariogenic.

Consequently, it was an object of the applicant to provide a hydrolysate complying simultaneously with these two requirements which appeared contradictory and according to which said hydrolysate..., while not being cariogenic, had to be usable in confectionery and, in particular, be technologically suitable for the manufacture of hard candies.

Now, the applicant has succeeded in finding that a non-cariogenic hydrolysate, whilst being suitable for use in confectionery—this term being taken in its wider above-mentioned acceptance—and particularly for the manufacture of "hard candies" should contain, on the one hand, only very few polysaccharides with a "degree of polymerization" or "DP" higher than 20, these polysaccharides—or the corresponding polyols obtained by hydrogenation—being responsible for the cariogenic character of the hydrolysates and, on the other hand, only a limited proportion of low molecular weight products, particularly those of DP 1 and DP 2, responsible, when they are present in too high a proportion, for the difficulties arising when the corresponding hydrolysates are applied in confectionery.

Thus, from a general point of view, in accordance with the invention, the non-cariogenic hydrogenated starch hydrolysates for confectionery manufacture and particularly for the manufacture of "hard candies" and chewing-gums comprise a content of polyols whose DP is higher than 20, this content being sufficiently low for the cariogenic character of these polyols not to be of trouble and a content of low molecular weight products, particularly of DP 1 and DP 2, sufficiently low for their presence not to interfere with the applicability of said hydrolysates in confectionery.

More particularly, the hydrolysates in accordance with the invention contain less than 3% of polyols whose DP is higher than 20, less than about 60% of maltitol (DP 2) and less than about 14% of sorbitol (DP 1).

Preferably, the hydrolysates according to the invention are characterized by:
a content lower than 3%, preferably than 1.5% of products whose DP is higher than 20,
a content of 4 to 14%, preferably from 5 to 8% of sorbitol,
a content of 45 to 60%, preferably from 50 to 53% of maltitol,
the balance to 100 being constituted by a mixture of polyols of DP 3 to 20,
a viscosity of 1500 to 2100 centipoises at 20° C.

To prepare a non-cariogenic hydrogenated hydrolysate for confectionery and particularly for the manufacture of "hard candies" and chewing gums, in accordance with the invention, a starch hydrolysate of D.E. (dextrose equivalent) of 17 to 27, obtained by the acid or enzymatic process, is submitted successively:
to the action of a β-amylase and
to the action of an α-amylase,
the amounts of α-amylase and of β-amylase and the duration of action of these two enzymes being selected so that the D.E. of the hydrolysate is brought to a value of 46 to 48 at the end of the first enzymatic treatment and to a value of 48 to 50 at the end of the second one, the final hydrolysate being hydrogenated.

It may be advantageous to reduce further the proportion of polysaccharides of DP greater than 20 subsisting at the end of the two successive enzymatic treatments according to the invention by submitting, in an additional step and before hydrogenation, the hydrolysate of D.E. of a value of 48 to 50 to the conjugate action of a β-amylase and of an enzyme hydrolysing the 1-6 bonds of the amylopectin.

According to a different embodiment of the invention, the starch hydrolysate of D.E. of a value of 17 to 27, obtained by the acid or enzymatic process, is submitted successively to saccharification by means of a β-amylase until a D.E. of 46 to 48 is obtained and to a fractionation by passage through a cationic resin preferably in the calcium form, or through a molecular sieve, the aim of this fractionation being to remove the polysaccharides whose DP is higher than 20; the syrup thus-obtained is then hydrogenated.

The hydrogenation can be carried out by the Raney nickel method.

Preferably, the amounts and conditions of action of the various enzymes above-mentioned are selected among the following ones:
β-amylase: 200 to 1000 international units per kg of dry substrate, pH 5.0 to 6.0, temperature from 50° to 60° C., duration of action from 30 to 72 hours;
α-amylase: 16,000 to 48,000 international units per kg of dry substrate, pH of 5.0 to 6.0, temperature from 50° C. to 60° C., duration of action from 16 to 30 hours;
enzyme hydrolysing the 1-6 bonds: 120 to 400 international units per kg of dry substrate, in the presence of 50 to 100 international units of β-amylase per kg of dry substrate, pH from 5.0 to 6.0, temperature from 50° to 60° C., duration of action from 24 to 48 hours.

As raw material for the preparation of the starting hydrolysate of D.E. 17-27, any type of starch, potato starch, manioc starch, wheat starch and the like may be used.

The enzymes utilized may be:
β-amylase in the form of malt extract,
α-amylase, obtained from *Bacillus subtilis* or Licheniformis,
enzyme hydrolysing to 1-6 bonds, as pullulanase or isomylase.

The action of β-amylase on the starch which has previously been liquified by the acid or enzymatic route is manifested by the formation of an amount of maltose of about 50%.

The α-amylase added according to the invention, alone at this time, accounts for a conversion of the molecules whose DP is higher than 20 towards oligosaccharides, and more accurately towards those of DP 8 to DP 6.

The molecules with high DP subsisting after the attack by the α-amylase and containing the 1-6 linkages, may advantageously be hydrolysed by an enzyme hydrolyzing the 1-6 linkages. The smaller molecules thus-obtained again become a suitable substrate for the action of the β-amylase.

Due to the fractionation in accordance with the above-mentioned embodiment, applied to the hydrolysate obtained by saccharification by means of β-amylase, the polysaccharides of high DP are removed, eluted first on passage through a cationic resin or through a molecular sieve.

To check the non-cariogenic character of the hydrogenated hydrolysates prepared, a simple test is carried out on the basis of the observation according to which a non-cariogenic product is not attacked by bacteria of the mouth and, thus, does not account for acidification, which is the cause of attack of the surface of the teeth and hence the cause of dental decay (caries). A simple test has been developed to determine this acidification in vitro. It is based on the evaluation of the decrease in pH in the course of time in a culture broth containing the glucide to be tested after seeding with saliva derived from several donors, in comparison with a control culture broth not containing any glucid.

A product may be considered non-cariogenic, provided that the pH difference which is observed, at the end of 21 hours, between the control and the product to be tested, is not too important and in practice less than 1 pH unit.

By way of illustration, a comparison is made between saccharose and two hydrogenated syrups; the first syrup was a syrup in accordance with the invention, noncariogenic (Syrup I) containing 0.5% of polyols with a DP higher than 20; the second syrup was a conventional syrup and cariogenic (Sirup II) containing 8% of polyols of DP higher than 20.

The variations of pH as a function of time for the water as control, saccharose and syrups No. I and No. II, are presented in Table I.

TABLE I

|  | t = 0 hour | t = 3 hours | t = 6 hours | t = 13 hours | t = 18 hours | t = 21 hours |
|---|---|---|---|---|---|---|
| Control water | 7.55 | 7.40 | 7.40 | 7.35 | 7.25 | 7.20 |
| Saccharose | 7.55 | 7.20 | 6.80 | 4.90 | 4.65 | 4.60 |
| Syrup No. I | 7.55 | 7.40 | 7.35 | 7.0 | 6.75 | 6.60 |
| Syrup No. II | 7.55 | 7.40 | 7.35 | 6.50 | 5.95 | 5.65 |

Some examples of hydrolysates in accordance with the invention with their process of preparation are indicated below.

EXAMPLE 1

A quantity of 12 liters of starch milk containing 33% of dry matter is liquified by the acid route to a D.E. of 22.0. It is introduced into a tank of 25 liters after having been previously cooled to 55° C. and the pH is readjusted to 5.65.

1730 international units of β-amylase in the form of malt extract are added. The speed of hydrolysis is followed by the titration of the reducing sugars, carried out in regular samplings until a stable maximum D.E. of 47.0 (36 hours) is obtained.

At this time, without pH correction, 140,000 international units of α-amylase are added and they are allowed to incubate at 55° C. until the glucide spectrum carried out indicates a polysaccharide proportion of DP higher than 20 of about 1.5% (36 hours). The glucide spectrum obtained is indicated in the Table II.

TABLE II

| Glucid distribution of the hydrolysate obtained | |
|---|---|
| DP Products | Syrup Content in % |
| DP 1 | 7.0 |
| DP 2 | 51.5 |
| DP 3 | 18.0 |
| DP 4 | 1.5 |
| DP 5 | 1.7 |
| DP 6 | 2.8 |
| DP 7 | 3.2 |
| DP 8 | 3.2 |
| DP 9 | 2.0 |
| DP 10 | 1.0 |
| Between DP 10 and DP 20 | 6.6 |
| DP higher than 20 | 1.5 |

After hydrogenation, the syrup is tested from the point of view of non-cariogeneity. The results of the test are shown in Table III.

TABLE III

| Results of non-cariogeneity test with this syrup | | | | | | |
|---|---|---|---|---|---|---|
|  | t = 0 hour | t = 6 hours | t = 9 hours | t = 13 hours | t = 18 hours | t = 21 hours |
| Control | 7.65 | 7.50 | 7.40 | 7.30 | 7.30 | 7.30 |
| Product according to Example 1 | 7.65 | 7.45 | 7.30 | 7.05 | 6.70 | 6.55 |

By means of this product, "hard candies" were manufactured. To do this, the product was pre-heated to 95° C. before being put into a continuous cooker working under vacuum of the Hamsac-Hansella type. The cooking temperature in this cooker was 170° C. at a maximum vapor pressure of 9 bars. After cooking for 7 minutes, the product was allowed to cool on a cold table at about 80° C.; the plastic mass was then placed in a roller then formed into ribbon or strip molded and cut up.

The candies thus-obtained are cooled by means of a draught to ambient temperature on a mat, then on a cold table before being packed; they are hard and brittle.

When carrying out the penetrometry test, by means of a penetrometer of the calibrated punch type, the value of 165 (in tenths of a millimeter) was recorded. The description of this test is to be found in the ASTM D.937 standards.

EXAMPLE 2

An amount of 12 liters of starch milk containing 33% of dry matter is liquified by a liquifying enzyme of Bacillus Subtilis to a D.E. of 18.0.

The pH is readjusted to 5.5 and the temperature is lowered to 55° C. 2,100 international units of β-amylase are reacted therewith for a saccharification time of 40 hours. Then 105,000 international units of α-amylase are added and are allowed to react at 55° C. for 24 hours.

An analysis by means of a molecular sieve carried out at this stage, shows the presence of 2% of polysaccharides of DP higher than 20.

380 international units of pullulanase and 220 international units of β-amylase are then added. 24 hours later, the rate of products of DP higher than 20 is equal to 0.5.

The glucide distribution of the hydrolysate thusobtained is shown in Table IV.

TABLE IV

| Glucide distribution of the hydrolysates obtained | |
|---|---|
| DP Product | Content of syrup in % |
| DP 1 | 4.0 |
| DP 2 | 52.4 |
| DP 3 | 18.0 |
| DP 4 | 1.6 |
| DP 5 | 0.7 |
| DP 6 | 2.7 |
| DP 7 | 2.8 |
| DP 8 | 3.1 |
| DP 9 | 2.6 |
| DP 10 | 1.6 |
| Between DP 10 and DP 20 | 10.0 |
| DP higher than 20 | 0.5 |

After hydrogenation, the non-cariogenic syrup obtained can be used in the manufacture of chewing gums, as liquid phase and replacing the glucose syrups traditionally used.

From the practical point of view, 25 parts of gum softened at 75° C. are kneaded in the presence of 15 parts of hydrogenated syrup, then progressively 60 parts of a solid phase constituted by powdered sorbitol are added gradually. The malaxing is then continued for 30 minutes.

The mixing and rolling of non-cariogenic chewing gums thus-manufactured are greatly facilitated by the use of the above-defined hydrogenated glucose syrup. After an accelerated aging test, the chewing gums obtained did not show surface recrystallization, contrary to what is obtained by the use, as the liquid phase, of sorbitol, of glycerin or of any other product.

EXAMPLE 3

A kilogram of starch milk containing 33% of dry matter is liquified by the acid process to a D.E. of 21.0 After cooling at 55° C., the pH is readjusted to 5.50 and 180 international units of β-amylase are added in the form of malt extract. The speed of hydrolyisis is followed by the titration of the reducing sugars, carried out on regular samples until the maximum D.E. of 48.0 is obtained.

The hydrolysate thus-obtained is then percolated, at the flow rate of 150 cm³/hour and at 80° C., through a column containing 400 cm³ of resin of the brand LEWATIT CA 9220 in the calcium form.

The first fractions representing the polysaccharides of high molecular weight are removed. These fractions constitute about 10% by weight of the original syrup.

The hydrolysate thus-obtained is then hydrogenated. The glucid spectrum is indicated in Table V.

TABLE V

| Glucid distribution of the hydrolysate obtained | |
|---|---|
| DP Product | Content of syrup in % |
| DP 1 | 5 |
| DP 2 | 55 |

TABLE V-continued

| Glucid distribution of the hydrolysate obtained | |
|---|---|
| DP Product | Content of syrup in % |
| DP 3 | 20 |
| DP 4 to DP 20 | 20 |
| DP higher than 20 | nil |

As a result of which and whatever the embodiment adopted, there is thus provided a non-cariogenic starch hydrolysate utilizable in confectionery and particularly for the manufacture of candies and chewing-gum, whose characteristics as well as those of the process of preparation also according to the invention are sufficiently clear from the preceding description, so that it is not necessary to stress further thereon.

As it is self-evident and as emerges already from the foregoing, the invention is in no way limited to those of its embodiments which have been more especially contemplated; it encompasses, on the contrary, all modifications.

We claim:

1. Non-cariogenic hydrogenated starch hydrolysate for confectionery and chewing-gums, comprising less than 3% of polyols whose DP is higher than 20, 4 to 14% sorbitol, 45 to 60% of maltitol, the balance up to 100% consisting essentially of a mixture of polyols of DP 3 to 20.

2. Hydrolysate according to claim 1, comprising less than 1.5% of products whose DP is higher than 20.

3. Hydrolysate according to claim 1, comprising 5 to 8% of sorbitol.

4. Hydrolysate according to claim 1, comprising 50 to 53% of maltitol.

5. Hydrolysate according to claim 1, comprising:
   less than 1.5% of products whose DP is higher than 20,
   5 to 8% of sorbitol,
   50 to 53% of maltitol.

6. Process for the preparation of a non-cariogenic hydrogenated hydrolysate for confectionery and chewing-gums, in which a starch hydrolysate of a D.E. of 17 to 27 obtained by acid or enzymatic hydrolysis is submitted successively to the steps comprising:
   the action of a β-amylase and
   the action of an α-amylase,
the amounts of α-amylase and of β-amylase and the duration of action of these two enzymes being selected so that the D.E. of the hydrolysate is brought to a value of 46 to 48 at the end of the first enzymatic treatment and to a value of 48 to 50 at the end of the second, the final hydrolysate being hydrogenated.

7. Process according to claim 6, wherein the hydrolysate whose D.E. is 48 to 50, is submitted to the conjugate action of a β-amylase and of an enzyme hydrolyzing the 1-6 linkages of the amylopectin to further reduce polysaccharides of DP greater than 20.

8. Process for the preparation of a non-cariogenic hydrogenated hydrolysate for confectionery and chewing-gums, wherein a starch hydrolysate of a D.E. of 17 to 27, obtained by acid or enzymatic hydrolysis, is submitted successively to the steps comprising saccharification by means of a β-amylase until a D.E. of 46-48 is obtained and then to a fractionation by passage through a cationic resin, or through a molecular sieve to remove polysaccharides whose DP is higher than 20, the thus obtained syrup then being hydrogenated.

9. Process according to claim 8, wherein the cationic resin is in the calcium form.

10. Process according to any one of claims 6 and 7, wherein the amount of the enzymes and the conditions of action of the enzymes comprises:

β-amylase: 200 to 1000 international units per kg of dry substrate, pH 5.0 to 6.0 temperature 50° to 60° C., duration of action 30 to 72 hours;

α-amylase: 16,000 to 48,000 international units per kg of dry substrate, pH 5.0 to 6.0, temperature 50° 60° C., duration of action 16 to 30 hours;

enzyme hydrolyzing 1-6 linkages: 120 to 400 international units per kg of dry substrate, in the presence of 50 to 100 international units of β-amylase per kg of dry substrate, pH of 5.0 to 6.0, temperature of 50° to 60° C., duration of action 24 to 48 hours.

* * * * *